United States Patent [19]
Geywitz et al.

[11] Patent Number: 5,787,078
[45] Date of Patent: Jul. 28, 1998

[54] FRAME SYNCHRONIZATION METHOD

[75] Inventors: Klaus Geywitz, Gerlingen; Artur Veloso, Göppingen, both of Germany

[73] Assignee: Alcatel N.V., Rijswijk, Netherlands

[21] Appl. No.: 694,820

[22] Filed: Aug. 9, 1996

Related U.S. Application Data

[63] Continuation-in-part of Ser. No. 399,459, Mar. 7, 1995, abandoned.

[30]  Foreign Application Priority Data

Mar. 9, 1994 [DE] Germany ............................ 44 07 794.7

[51] Int. Cl.$^6$ ........................................................ H04J 3/06
[52] U.S. Cl. ........................... 370/331; 370/504; 370/510; 455/502; 375/356
[58] Field of Search ................................ 370/276, 280, 370/330, 345, 331, 347, 503, 504, 509, 510, 512, 520; 455/465, 436, 560, 422, 434, 500, 502; 375/356, 363, 364, 366, 354, 357; 371/42, 47.1

[56]   References Cited

U.S. PATENT DOCUMENTS

| | | |
|---|---|---|
| 4,638,478 | 1/1987 | Hatabe . |
| 5,175,734 | 12/1992 | Sarkoezi . |
| 5,177,740 | 1/1993 | Toy et al . |
| 5,243,653 | 9/1993 | Malek et al. . |
| 5,274,628 | 12/1993 | Thaller et al. . |
| 5,375,254 | 12/1994 | Owen . |
| 5,418,838 | 5/1995 | Havermans et al. . |
| 5,448,570 | 9/1995 | Toda et al. . |

FOREIGN PATENT DOCUMENTS

| | | |
|---|---|---|
| 0298130 | 1/1989 | European Pat. Off. . |
| 0419895 | 4/1991 | European Pat. Off. . |
| 0437835 | 7/1991 | European Pat. Off. . |
| 3511430 | 10/1986 | Germany . |
| 3627135 | 2/1988 | Germany . |

OTHER PUBLICATIONS

Mulder, R.J.: DECT, a universal cordless access system. In: Philips Telecommunication Review, vol. 49, No. 3, Sep. 1991, pp. 68–73.

Forer, Josef; Kleindl, Günther: Schnurlose Telefone und ihre Evolution zum persönlichen Kommunikationssystem In: ntz, Bd. 43, 1990, H.r, pp.214–217.

Tuttlebee, Walter, H.W.: Cordless Personal Communications. In: IEEE Communications Magazine, Dec. 1992, pp. 42–53.

Neuner, Hermann: u.a.: Synchronisation einer Mobilstation im GMS–System DMCS 900 In: Frequenz 47, 1993, pp. 66–72.

Pilger, Ulrich: Sturktur der DECT–standards. In: Nachrich–tentech., Elektron, Berlin 42, 1992, 1, pp.23–29.

Patent Abstracts of Japan, vol. 013 No. 109 (E–727), 15 Mar. 1989 & JP–A–63 278436 (NEC Corp) 16 Nov. 1988.

*Primary Examiner*—Douglas W. Olms
*Assistant Examiner*—Chau T. Nguyen
*Attorney, Agent, or Firm*—Ware, Fressola, Van Der Sluys & Adolphson LLP

[57]   ABSTRACT

The problem of pulse frame synchronization occurs for example in a telecommunications system with cordless terminals operating according to the DECT standard. To establish a radio connection between base station and a cordless terminal, the base station scans its radio cell in sequence with the available ten high-frequency carriers in the DECT frame rhythm. In a multiple cell environment, the synchronization of all base stations belonging to a cordless telecommunications installation is necessary, to enable all base stations to scan the same frequency at the same time. This is achieved by blanking the DECT multi-frame synchronization pulses. The pulse gap is evaluated by error detection circuits which are present anyway, and used for the PSCN Primary receiver Scan Number-synchronization.

4 Claims, 3 Drawing Sheets

FRAME SYNCHRONIZATION METHOD

This is a continuation-in-part of application Ser. No. 08/399,459 filed on Mar. 7, 1995, now abandoned.

TECHNICAL FIELD

The invention concerns a method for synchronizing pulse frames, particularly in a telecommunications system with cordless terminals, called a cordless telecommunications system for short, whose basic functions and characteristics have been described by a European standardization committee, the European Telecommunications Standards Institute ETSI, as the European standard for cordless telecommunication, DECT in short, the Digital European Cordless Telecommunications-Standard.

BACKGROUND OF THE INVENTION

Synchronization processes are necessary to ensure an interruption-free channel change within a radio cell, or to be able to undertake an interruption-free transition from a first cell bundle to a second cell bundle, the so-called handover, due to a change in the location of the cordless terminal in a multiple cell environment. (The technical term for "interruption-free" is also known as "seamless" in DECT language.) Each radio cell is supplied by a base station, which can operate a specified number of cordless terminals simultaneously. To that effect, the frequency band established by the DECT standard is divided into 10 carrier frequencies. Each of these carriers is subdivided into 24 time slots, where the first twelve are used to transmit from the base station to the cordless terminal, the remaining twelve for the inverse transmission direction. Thus, the DECT high frequency spectrum provides 120 full duplex channels. The 24 time slots are combined into a DECT frame. Each time slot is subdivided into several fields, and in the present situation the A-field is used for the transmission of signalling information, and the B-field for the transmission of user data. A certain signalling capacity is made available in the A-field, which is assigned as necessary to a logic channel such as an I-, C-, Q-, N-, M-, P-channel, defined by the DECT standard. Since 16 DECT frames are always combined into a DECT multi-frame, the data of the logic channels are multiplexed through this DECT multi-frame. In this way each logic channel of a DECT multi-frame is fully available, for example the synchronization information for the DECT multi-frame, which is required by every cordless terminal of a cell bundle for its multi-frame synchronization, is transmitted in the eighth DECT frame of the Q-channel.

The DECT standard describes a frequency scanning algorithm for a cordless telecommunications system with several base stations, which can be implemented with a PSCN synchronization. PSCN is short for Primary receiver Scan Carrier Number. Since every base station has the entire frequency spectrum assigned by the DECT standard available, each above described base station has ten high-frequency carriers available, where each is subdivided into twelve full duplex transmission paths. Although the PSCN algorithm specifies that all base stations must scan the same frequency at the same point in time, in order to be able to perform a cell change with a cordless terminal, also called a handover, no information is provided for the technical realization. The result is the task of presenting a method for the PSCN synchronization, which can be performed with a small expense for hardware.

SUMMARY OF THE INVENTION

According to the invention, this task is fulfilled by a method wherein the frames are synchronized by means of a frame alignment pulse and are combined into multiframes and synchronized in the multiframe rhythm by means of a multiframe alignment pulse which follows after a given number of frames, characterized in that a multiframe sequence is synchronized by blanking a multiframe alignment pulse. The nature of the invention includes evaluating missing pulse transmissions for information purposes, and using circuits in multivalent form to detect errors in units which are used to manage the base stations.

BRIEF DESCRIPTION OF THE DRAWINGS

In the following, the invention will be explained by means of a configuration example. The pertinent drawing illustrates.

BEST MODE FOR CARRYING OUT THE INVENTION

Figure 1:
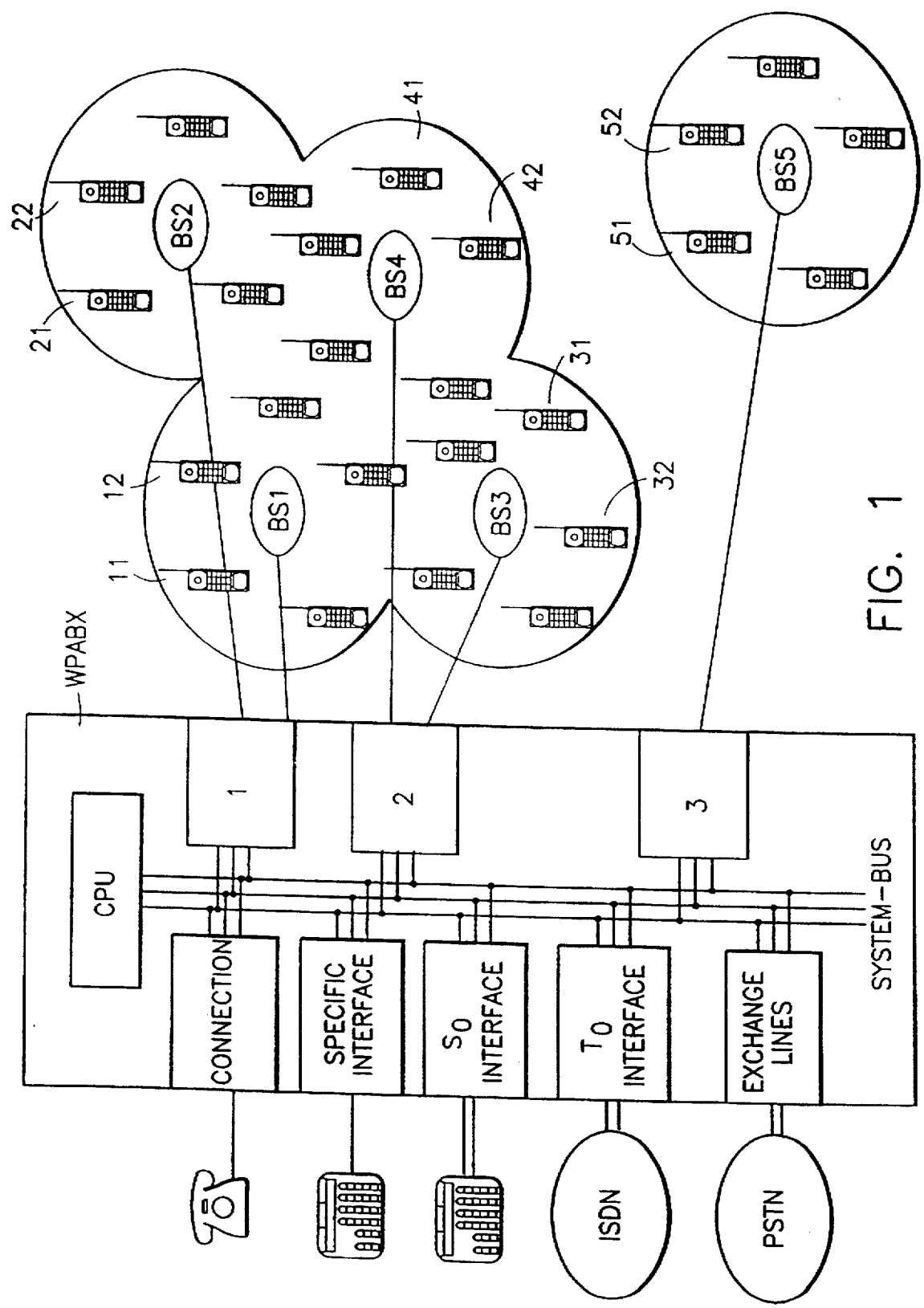
FIG. 1 is a configuration of a cordless telecommunications system.

According to FIG. 1, a cordless telecommunications system, in this instance a cordless WPABX, Wireless Private Area Branch Exchange, essentially comprises a central unit CPU, which manages different interface circuits via a system bus. Such an installation can be used as an autonomous installation for connecting wired and/or cordless terminals. However, it is also possible to connect the installation to existing networks. The connection to a Public Switched Telephone Network PSTN is possible via the interface circuit for analog exchange lines, and the connection to an Integrated Services Digital Network ISDN can take place via the $T_O$-interface circuit. The base stations BS1, . . . , BS5 are respectively connected by four-wire lines to the DECT interface circuits 1, 2, 3. Each base station BS1, . . . , BS5 supplies one radio cell in which it establishes the radio connection with the cordless terminals. For example, in the condition illustrated in FIG. 1, the cordless terminals 11, 12 are located in the radio cell of base station BS1, the cordless terminals 21, 22 are located in the radio cell of base station BS2, and the cordless terminals 31, 32 in the radio cell of base station BS3. Each DECT interface circuit 1, 2, 3 contains at least one application-specific circuit MACASIC, to which a base station is connected in each instance. The base stations are controlled, synchronized and remote-supplied via the four-wire line of the DECT interface.

Figure 2:
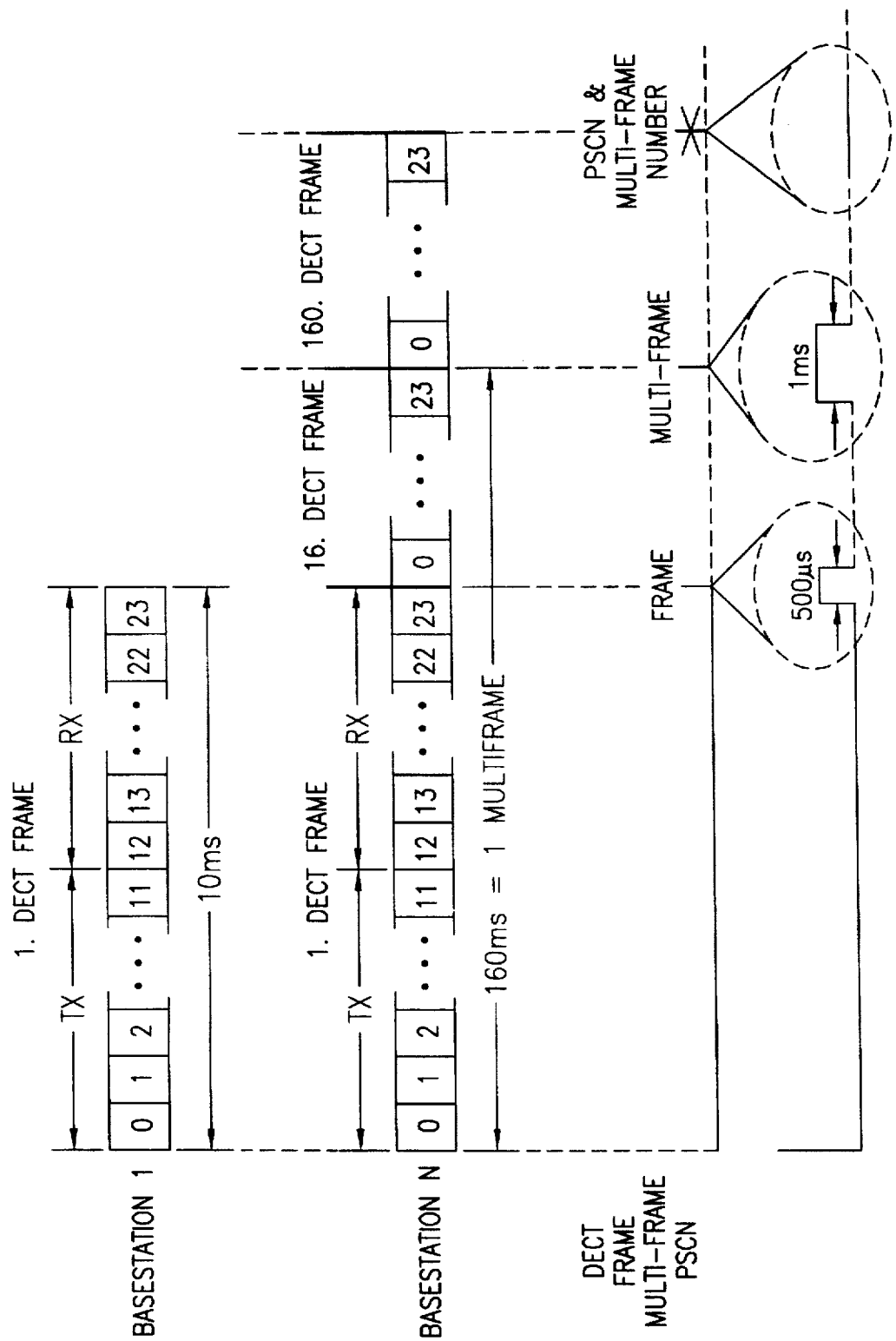
FIG. 2 is the assembly in principle of a DECT frame, a DECT multi-frame and pulses for the synchronization of frames, multi-frames and PSCN.

To be able to establish a radio connection to the cordless terminals, each base station scans its radio cell with the ten available high-frequency carriers, in sequence. Each frequency is scanned during the time of a DECT frame, thus for a time of 10 ms. In that way, 16 frequencies are scanned in a multi-frame, namely the frequencies f1 to f10 and f1 to f6. If this scanning rhythm were to be maintained for each multi-frame, the frequencies would be scanned at different times, and the frequencies f7 to f10 would be at a disadvantage. It is therefore necessary to scan the frequencies continuously for the duration of five multi-frames, because then each of the ten frequencies is scanned eight times within a time period of 80 DECT frames. Although each DECT interface circuit 1, 2, 3 itself is synchronized to a multi-frame pulse and continuously scans the frequencies by itself, the synchronization to each other is missing. This means that, during a cell bundle change, the cordless terminal encounters two base stations that operate asynchronously with each other. Although it is basically possible for the cordless terminal to synchronize itself to the new base station, this however requires a relative long period of time and additional energy. The DECT interface circuits 1, 2, 3 are also synchronized with each other in order to carry out a quick handover at a low expense of energy. This synchronization of the DECT interface circuits is called a PSCN synchronization. FIG. 2 illustrates an overview of the connection between DECT frames, English DECT frame, multiframes, English multi-frame, and the pertinent synchronization pulses. The PSCN synchronization is depicted in FIG. 2 at the 10th. multi-frame. A PSCN synchronization at a distance of five multi-frames and whole-number multiples thereof would be possible. The distance of ten multi-frames advantageously produces a low load on the central CPU unit.

According to the invention, the PSCN synchronization takes place by blanking a multi-frame synchronization pulse. Use is made of the fact that an interrupt-signal is released by the DECT interface circuit, when an expected pulse is missing. This interrupt-signal usually serves to detect errors. But if an error is present, not only would a multi-frame synchronization pulse be missing, but also a DECT frame synchronization pulse. In this way, the one-time missing of a multi-frame synchronization pulse can be used for the PSCN-synchronization of all DECT interface circuits, so that all base stations belonging to a cordless telecommunications installation can scan the radio cells at the same time and at the same frequencies. The PSCN-synchronization is then realized without any additional expense for hardware.

Figure 3:
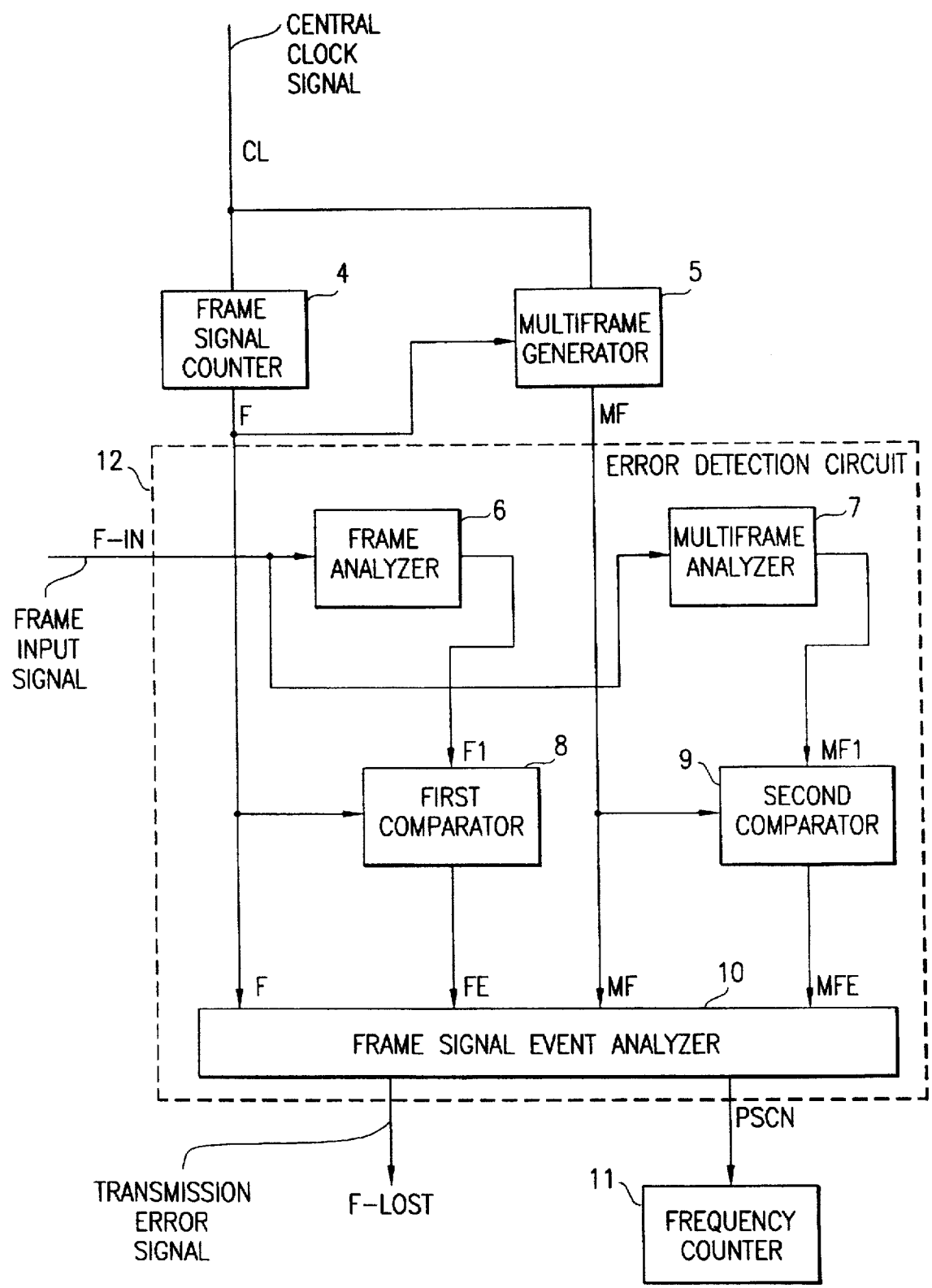
FIG. 3 is a block diagram of an error circuit of the present invention.

FIG. 3 shows an error detection circuit 12 (in dashed lines), a frame signal counter 4, a multiframe generator 5 and a frequency counter 11. The error detection circuit 12 comprises a frame analyzer 6, a multiframe analyzer 7, a first comparator 8, a second comparator 9 and a frame signal event analyzer 10.

FIG. 3 is described with respect to the DECT frames shown in FIG. 2. The frame counter 4 responds to a central clock CL and provides a frame clock signal F with a pulse distance of 10ms. The multiframe generator 5 which comprises a 16:1 divider responds to the central clock CL and the frame clock signal F, and generates a multiframe generator signal MF with a pulse distance of 160 ms. The frame clock signal F and the multiframe generator signal MF are input signals to the error detection circuit 12 in addition to a frame input signal F-IN, which contains information about the sequence of the base station N in FIG. 2. The frame analyzer 6 responds to the frame input signal F-IN, and provides a frame analyzed signal F1 indicating a frame is analyzed. The multiframe analyzer 7 responds to the frame input signal F-IN, and provides a multiframe analyzed signal MF1 indicating a multiframe is analyzed. The first comparator 8 compares the frame clock signal F with the frame analyzed signal F1, and provides a frame error signal FE if the frame analyzed signal F1 is missing or if the frame analyzed signal F1 is not synchronous with the frame clock signal F. The second comparator 9 compares the multiframe analyzed signal MF1 with the multiframe generator signal MF, and provides a multiframe error signal MFE if the multiframe analyzed signal MF1 is missing or if the multiframe analyzed signal MF1 is not synchronous with the multiframe generator signal MF.

The frame signal event analyzer 10 responds to the frame clock signal F, the frame error signal FE, the multiframe generator signal MF and multiframe error signal MFE, and provides either a PSCN signal or a transmission error F-Lost signal according to the following table:

| Input | Output |
| --- | --- |
| FE | F-Lost |
| FE and MFE | F-Lost |
| MFE | PSCN |

The table shows that the frame signal event analyzer 10 provides the PSCN signal if only the multiframe generator signal MF is missing, and provides the transmission error F-Lost signal if either the frame error signal FE is missing, or the frame error signal FE and the multiframe generator signal MF are both missing. The PSCN signal is a reset signal for the frequency counter 11. If the PSCN signal occurs, the frequency counter 11 is reset and all base stations start scanning the same frequency, so that a change from one cell to another is possible without problems, that means seamless handover or seamless handoff.

In effect, by blanking the multiframe pulse a reset signal for a frequency counter results. As shown in FIG. 2, a pulse sequence includes frame pulses and multiframe pulses. By analyzing the pulse sequence, the claimed invention would realize a PSCN signal, according to the following table:

If frame and multiframe pulse are missing, then provide a transmission error F-Lost signal, If a frame pulse is missing, then provide a transmission error F-Lost signal, and If only one multiframe pulse is missing, then provide a PSCN signal, because it is improbable that by disturbed transmission only one multiframe pulse is missing. The detection circuit 12 serves on the one hand for detecting a fault and on the other hand for generating a PSCN signal.

What is claimed is:

1. A frame synchronization method for a cordless telephone system having an exchange with interface circuits, having base stations that supply radio cells for establishing a radio connection with cordless terminals and that are respectively connected to interface circuits, the frame synchronization method including the steps of synchronizing frames by means of a frame alignment pulse, combining the frames into multiframes, and synchronizing the multiframes in a multiframe sequence by means of a multiframe alignment pulse which follows after a given number of the frames, characterized in that the method further includes the step of synchronizing the interface circuits of the exchange with the multiframe sequence by blanking a multiframe alignment pulse so that the base stations can scan the radio cells at the same time and at the same frequency to enable a cell change with a respective cordless terminal.

2. A method as claimed in claim 1, characterized in that the method includes the step of cyclically blanking respective integral multiples of fifth multiframe pulses for all base stations.

3. A method as claimed in claim 2, characterized in that the method includes the step of using an error detection circuit to detect the absence of a Digital European Cordless Telecommunications multiframe alignment pulse.

4. A method as claimed in claim 3, characterized in that in the absence of the Digital European Cordless Telecommunications multiframe alignment pulse, the method includes the step of generating with the error detection circuit a Primary receiver Scan Carrier Number synchronizing signal, and that in the absence of the Digital European Cordless Telecommunications multiframe alignment pulse and of further Digital European Cordless Telecommunications frame alignment pulses, the method includes the step of releasing an interrupt signal which indicates a transmission error.

* * * * *